(12) United States Patent
Chae

(10) Patent No.: US 8,989,937 B2
(45) Date of Patent: Mar. 24, 2015

(54) EMERGENCY STEERING SYSTEM AND CONTROLLING METHOD OF THE SAME

(71) Applicant: Samsung Techwin Co., Ltd., Changwon (KR)

(72) Inventor: Hee-Seo Chae, Changwon (KR)

(73) Assignee: Samsung Techwin Co., Ltd., Changwon (KR)

( * ) Notice: Subject to any disclaimer, the term of this patent is extended or adjusted under 35 U.S.C. 154(b) by 0 days.

(21) Appl. No.: 13/910,205

(22) Filed: Jun. 5, 2013

(65) Prior Publication Data

US 2013/0345915 A1 Dec. 26, 2013

(30) Foreign Application Priority Data

Jun. 20, 2012 (KR) ........................ 10-2012-0066316

(51) Int. Cl.
*B60L 9/00* (2006.01)
*B62D 6/00* (2006.01)
*B62D 5/00* (2006.01)
*B62D 9/00* (2006.01)

(52) U.S. Cl.
CPC ........ *B62D 6/00* (2013.01); *B62D 5/003* (2013.01); *B62D 9/005* (2013.01)
USPC ........................................................ 701/22

(58) Field of Classification Search
CPC ........................................................ B60K 1/02
USPC ........................................................ 701/22
See application file for complete search history.

(56) References Cited

U.S. PATENT DOCUMENTS

| | | | |
|---|---|---|---|
| 2008/0059018 A1* | 3/2008 | Kueperkoch et al. | 701/34 |
| 2009/0189373 A1* | 7/2009 | Schramm et al. | 280/731 |
| 2009/0319120 A1* | 12/2009 | Hatanaka et al. | 701/34 |

FOREIGN PATENT DOCUMENTS

| | | |
|---|---|---|
| JP | 2004-112982 A | 4/2004 |
| JP | 4333380 B2 | 7/2009 |
| KR | 10-0191661 B1 | 6/1999 |
| KR | 10-0204770 B1 | 6/1999 |
| KR | 10-2011-0089602 A | 8/2011 |

* cited by examiner

*Primary Examiner* — James Trammell
*Assistant Examiner* — Michael D Lang
(74) *Attorney, Agent, or Firm* — Sughrue Mion, PLLC

(57) ABSTRACT

Provided are an emergency steering system and a method of controlling the emergency steering system. The emergency steering system includes a plurality of wheel units each including an in-wheel motor and a steering unit; a motor controller configured to control an electric current applied to at least one of the in-wheel motors; and an emergency steering signal input unit configured to receive an emergency steering signal, which is a signal for applying the electric current to the at least one of the in-wheel motors, transmit the received emergency steering signal to the motor controller, and control the motor controller based on the emergency steering signal, wherein the motor controller configured to control the electric current applied to the at least one of the in-wheel motors based on the emergency steering signal.

17 Claims, 2 Drawing Sheets

EMERGENCY STEERING SYSTEM AND CONTROLLING METHOD OF THE SAME

CROSS-REFERENCE TO RELATED PATENT APPLICATION

This application claims priority from Korean Patent Application No. 10-2012-0066316, filed on Jun. 20, 2012, in the Korean Intellectual Property Office, the disclosure of which is incorporated herein in its entirety by reference.

BACKGROUND

1. Field

Apparatuses and methods consistent with exemplary embodiments relate to an emergency steering system and controlling the emergency steering system, and more particularly, to an emergency steering system that enables steering in an emergency and controlling the emergency steering system.

2. Description of the Related Art

Generally, a steering system is a device changing a direction of a vehicle. Here, the steering system may change the direction of the vehicle by controlling a steering unit by operation of a handle unit.

In such a steering system, a main controller may control a steering controller by sensing the operation of the handle unit. Here, the steering controller may actually change the direction of the vehicle by controlling the steering unit installed in a wheel unit. However, in such a case, when the handle unit, the main controller, the steering controller, the steering unit, etc. break down, the direction of the vehicle may not be controlled, which may lead to a major accident. Thus, there is a need for an apparatus for controlling the direction of a vehicle in an emergency due to a breakdown, etc.

Furthermore, Japanese Patent Publication No. 2004-112982 (Title of Invention: Rotation sensor breakdown diagnosis system; Applicant: NISSAN MOTOR Co., Ltd.) specifically discloses such a general steering system.

SUMMARY

One or more exemplary embodiments provide an emergency steering system and a method of controlling the emergency steering system for a user's safety in an emergency by enabling steering when a steering breaks down.

According to an aspect of an exemplary embodiment, there is provided an emergency steering system including: a plurality of wheel units each including an in-wheel motor and a steering unit; a motor controller configured to control an electric current applied to at least one of the in-wheel motors; and an emergency steering signal input unit configured to receive an emergency steering signal, which is a signal for applying the electric current to the at least one of the in-wheel motors, transmit the received emergency steering signal to the motor controller, and control the motor controller based on the emergency steering signal, wherein the motor controller configured to control the electric current applied to the at least one of the in-wheel motors based on the emergency steering signal.

An amount of the electric current applied to the at least one of the in-wheel motors may be changed based on the emergency steering signal.

The emergency steering signal input unit may include a direction display unit that displays a direction.

According to an aspect of another an exemplary embodiment, there is provided an emergency steering system including: a plurality of wheel units including at least one in-wheel motor and at least one steering unit; a steering unit controller electrically connected to the steering unit and configured to control the steering unit; and a main controller that is electrically connected to the steering unit controller to control the steering unit controller and configured to sense a breakdown of the steering unit controller.

The emergency steering system may further include an alarm unit that externally provides information, wherein the main controller controls the alarm unit to reveal breakdown information if it is determined that the steering unit controller is broken down.

The emergency steering system may further include a motor controller that controls an electric current applied to each in-wheel motor, wherein the main controller is electrically connected to the motor controller, and controls operation of the in-wheel motor by applying an emergency steering signal to the motor controller if it is determined that the steering unit controller is broken down.

The main controller may control the motor controller to change an intensity of an electric current applied to the in-wheel motor based on the emergency steering signal.

The emergency steering wheel may further include: a motor controller that controls an electric current applied to the in-wheel motor; and an emergency steering signal input unit that externally receives an emergency steering signal from a user and transmits the received emergency steering signal to the motor controller, wherein the motor controller controls the in-wheel motor based on the emergency steering signal.

An intensity of the electric current applied to the in-wheel motor may be changed based on the emergency steering signal.

The emergency steering signal input unit may include a direction display unit that displays a direction.

According to another aspect of the present invention, there is provided a method of controlling an emergency steering system, including: determining, via a main controller, whether a steering controller is broken down; receiving an emergency steering signal from an emergency steering signal input unit; and controlling, via a motor controller, at least one in-wheel motor based on the emergency steering signal.

The motor controller may change an intensity of an electric current applied to the in-wheel motor based on the emergency steering signal.

The main controller may externally display a breakdown of the steering controller if it is determined that the steering controller is broken down.

According to an aspect of another exemplary embodiment, there is provided a method of controlling an emergency steering system, including: determining, via a main controller, whether a steering controller has broken down; and controlling, via the main controller, at least one in-wheel motor through a motor controller if it is determined that the steering controller is broken down.

An amount applied to the in-wheel motor may be changed based on the emergency steering signal.

BRIEF DESCRIPTION OF THE DRAWINGS

The above and other features and advantages will become more apparent by describing in detail exemplary embodiments with reference to the attached drawings, in which.

DETAILED DESCRIPTION OF THE EXEMPLARY EMBODIMENTS

Figure 1:
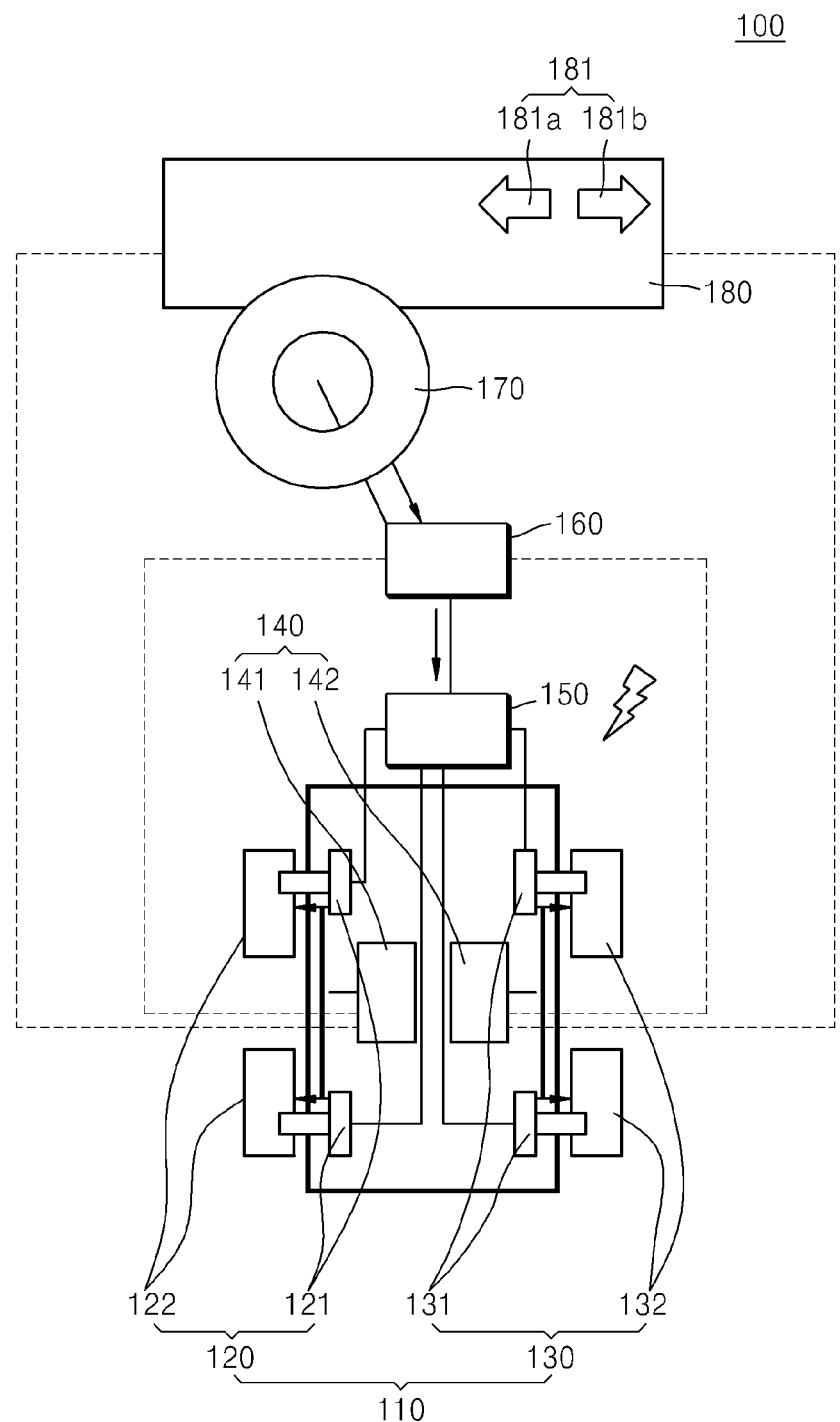
FIG. 1 is a conceptual diagram illustrating an emergency steering system according to an exemplary embodiment.

Expressions such as "at least one of," when preceding a list of elements, modify the entire list of elements and do not modify the individual elements of the list.

The inventive concept will now be described more fully with reference to the accompanying drawings, in which exemplary embodiments are shown. The inventive concept may, however, be embodied in many different forms and should not be construed as being limited to the embodiments set forth herein; rather, these embodiments are provided so that this disclosure will be thorough and complete, and will fully convey the inventive concept to those skilled in the art. Terms, such as "comprising" and "comprise", may be intended to indicate a plurality of components unless the terms are used with the term "only". In the drawings, the thicknesses of layers and regions are exaggerated for clarity. Terms such as "first and "second" are used to describe various components, but the components are not limited by the terms. Like reference numerals in the drawings denote like elements, and thus, their description will be omitted.

FIG. 1 is a conceptual diagram illustrating an emergency steering system 100 according to an exemplary embodiment. The emergency steering system 100 may be implemented in a vehicle such as a moving vehicle.

Referring to FIG. 1, the emergency steering system 100 may include a plurality of wheel units 110 respectively including an in-wheel motor (not shown) and a steering unit (not shown).

The plurality of wheel units 110 may include a first wheel unit 120 arranged on the left side of a vehicle and a second wheel unit 130 arranged on the right side of the vehicle. Here, it is possible to provide a plurality of first wheel units 120 and a plurality of second wheel units 130.

The first wheel unit 120 may include a first in-wheel motor 122 and a first steering unit 121. Also, the second wheel unit 130 may include a second in-wheel motor 132 and a second steering unit 131. In the current embodiment, the first wheel unit 120 has two first in-wheel motors and two first steering units, and the second wheel unit 130 has two second in-wheel motors and two second steering units. The inventive concept, however, is not limited to this embodiment, and thus, the first wheel unit 120 and the second wheel unit 130 may have a different number of in-wheel motors and steering units. Also, the inventive concept is not limited to an emergency steering system having only four in-wheel motors and four steering units.

The emergency steering system 100 may include a motor controller 140 that controls electric current applied to respective in-wheel motors, namely, the first and second in-wheel motors 122 and 132. The motor controller 140 may be an electronic substrate formed of a simple circuit. Also, the motor controller 140 may be a part that is programmed in a main controller 160 and is operated.

The emergency steering system 100 may include an emergency steering signal input unit 180 that externally receives an emergency steering signal from a user and transmits the emergency steering signal to the motor controller 140. Here, the emergency steering signal input unit 180 may be directly connected to the motor controller 140, and may control the motor controller 140 through the emergency steering signal. In particular, the emergency steering signal input unit 180 may transmit the emergency steering signal to the motor controller 140 so that the motor controller 140 may control respective in-wheel motors, namely, the first and second in-wheel motors 122 and 132.

The emergency steering signal input unit 180 may be formed in various forms. For example, the emergency steering signal input unit 180 may be formed as a mechanical button. Also, the emergency steering signal input unit 180 may be formed as a touch screen. However, the emergency steering signal input unit 180 is not limited thereto, and may include all devices that are able to receive an emergency steering signal. However, the description of the emergency steering signal input unit 180 will focus on a case where the emergency steering signal input unit 180 is formed as a button for the convenience of description.

The emergency steering signal input unit 180 may include a direction display unit 181 that indicates a direction. The direction display unit 181 may be variously formed, and the direction display unit 181 may be displayed as an arrow to indicate a direction. The direction display unit 181 may include a first direction display unit 181a that indicates a first direction and a second direction display unit 181b that indicates a second direction.

Here, the first direction display unit 181a and the second direction display unit 181b may be arranged to display opposite directions. The first direction display unit 181a and the second direction display unit 181b may respectively include lamps, and thus, a direction may be displayed by operation of a lamp in the direction to which the user applies force to the emergency steering signal input unit 180.

The emergency steering system 100 may include a steering controller 150 for controlling the first steering units 121 and the second steering units 131. The emergency steering system 100 may include the main controller 160 which is electrically connected to the steering controller 150 to control the steering controller 150. The main controller 160 may sense a breakdown of the steering controller 150.

Here, the main controller 160 may be electrically connected to the motor controller 140 as well as the steering controller 150. Furthermore, the main controller 160 may not be electrically connected to the motor controller 140. According to an exemplary embodiment, the main controller 160 and the steering controller 150 may be formed in a single unit. Also, according to an exemplary embodiment, the main controller 160, the steering controller 150 and the motor controller 140 may be formed in a single unit.

When the main controller 160 is connected to the motor controller 140, the main controller 160 may control the motor controller 140. In contrast, when the main controller 160 is not connected to the motor controller 140, the motor controller 140 may be electrically connected to the emergency steering signal input unit 180, and may be controlled by the emergency steering signal input unit 180.

Hereinafter, a method of operating the emergency steering system 100 in each case will be described.

The emergency steering system 100 may include a handle unit 170 which is electrically connected to the main controller 160 and receives a user's steering operation signal. Here, the handle unit 170 will not be described here in detail because the handle unit 170 is a general handle unit installed in a vehicle.

Figure 2:
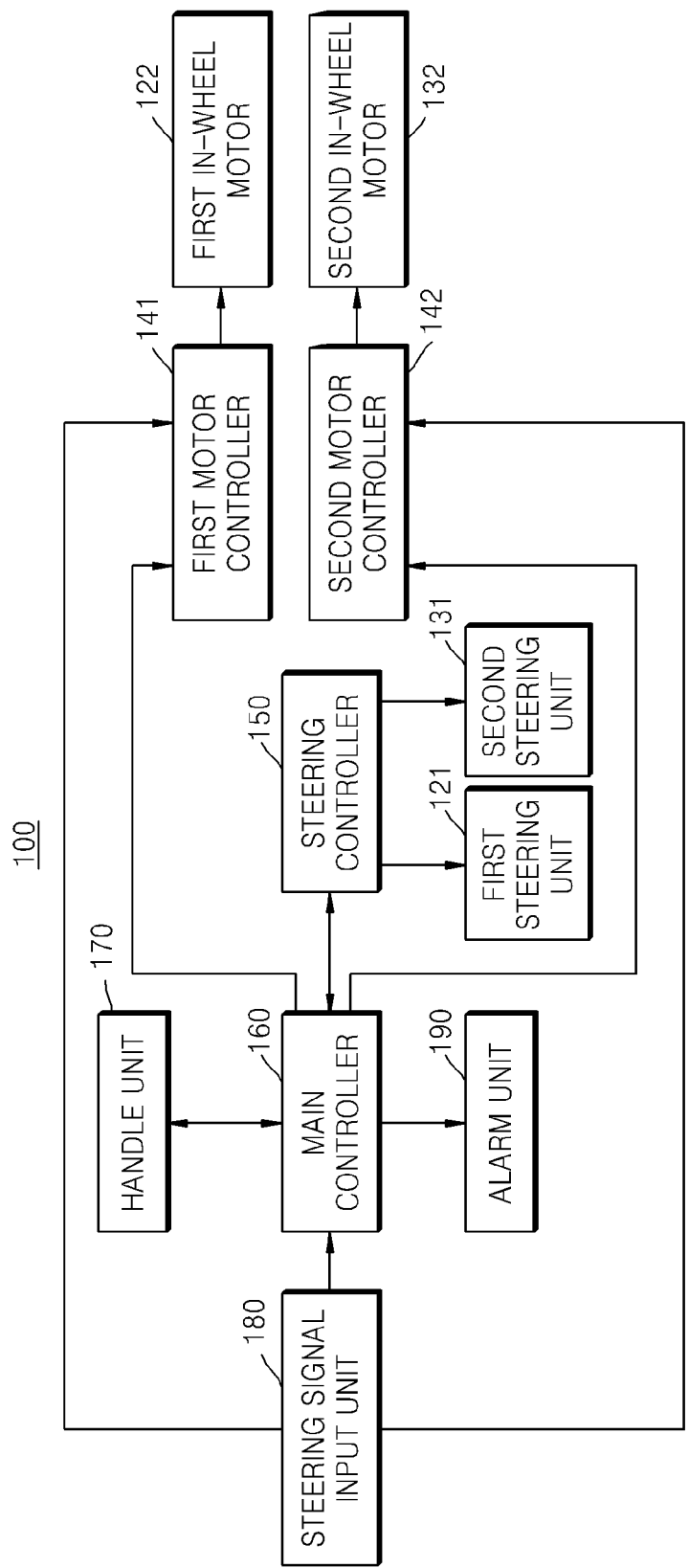
FIG. 2 is a block diagram illustrating a method of controlling an emergency steering system illustrated in FIG. 1, according to an exemplary embodiment.

The emergency steering system 100 may include an alarm unit 190 as shown in FIG. 2 described later that externally provides information. Here, if the main controller 160 determines that the steering controller 150 has broken down, the alarm unit may provide the breakdown information.

The alarm unit may include at least one of a display unit (not shown) that externally displays breakdown information to a user and an alarm part (not shown) that provides the breakdown information to an external user through a sound. However, the description will focus on a case where the alarm unit includes the display unit for the convenience of description.

The alarm unit may be installed inside the vehicle. Here, the alarm unit may display states of devices that are needed in steering the vehicle, such as the first steering units 121 and the second steering units 131, the first in-wheel motors 122 and the second in-wheel motors 132, the motor controller 140, the steering controller 150, and the main controller 160. Here, the alarm unit may be formed as a touch screen and may enlarge a part where a user touches.

FIG. 2 is a block diagram illustrating a method of controlling an emergency steering system 100 illustrated in FIG. 1, according to an exemplary embodiment.

Referring to FIG. 2, a user may input a steering operation signal through the handle unit 170 while driving a vehicle. Here, the user may input the steering operation signal by rotating the handle unit 170.

If the steering operation signal is inputted as described above, the main controller 160 may calculate a steering angle by measuring a rotation level of the handle unit 170. Here, the calculated steering angle may be transmitted from the main controller 160 to the steering controller 150.

If the steering operation signal is inputted as described above, the steering controller 150 may control at least one of the first steering units 121 and the second steering units 131. The steering controller 150 may control a direction of a vehicle by controlling at least one of the first steering unit 121 and the second steering unit 131 according to the steering operation signal of the handle unit 170.

In the case of the emergency steering system 100 that is operated as described above, each component may break down. Hereinafter, cases where respective components break down will be described in detail.

1. When a Handle Unit Breaks Down

When the handle unit 170 breaks down, the main controller 160 may sense the breakdown. For example, if movement angle sensing information of a handle installed in the handle unit 170 is not transmitted to the main controller 160, the main controller 160 may determine that the handle unit 170 has broken down. Here, if it is determined that the handle unit 170 has broken down, the main controller 160 may externally display whether the handle unit 170 has broken down through the alarm unit 190.

When the handle unit 170 breaks down in other situations, the user may also recognize the breakdown of the handle unit 170. For example, when the handle unit 170 has broken down, even if the user operates the handle unit 170, the direction of the vehicle does not change, and thus, the user may easily determine whether the direction of the vehicle is abnormal.

(1) An Operation of Receiving an Emergency Steering Signal from an Emergency Steering Signal Input Unit;

If steering of a vehicle is impossible because of the breakdown of the handle unit 170, a user may input an emergency steering signal through the emergency steering signal input unit 180.

For example, the emergency steering signal input unit 180 may be pushed by the force of a user as described above. Here, the emergency steering signal input unit 180 may be formed to be pushed in a direction desired by the user. For example, the emergency steering signal input unit 180 may be formed to be pushed in the left or right direction by the user.

(2) An Operation of Controlling an in-Wheel Motor by a Motor Controller Based on an Emergency Steering Signal When an emergency steering signal is inputted as described above, the emergency steering signal may be transmitted to the motor controller 140. Here, the motor controller 140 may control at least one of the first in-wheel motors 122 and the second in-wheel motors 132.

The motor controller 140 may include a first motor controller 141 that controls the first in-wheel motors 122, and a second motor controller 142 that controls the second in-wheel motors 132.

When the left part of the emergency steering signal input unit 180 is pushed by a user, the motor controller 140 may control at least one of the first in-wheel motors 122 and the second in-wheel motor 132. For example, the first motor controller 141 may control the at least one of the first in-wheel motors 122 to be stopped or decelerated, and may control at least one of the second in-wheel motors 132 to be driven or decelerated.

The first motor controller 141 may be controlled to reduce speed of at least one of the first in-wheel motors 122 while controlled as described above. Furthermore, the second motor controller 142 may be controlled to reduce speed of at least one of the second in-wheel motors 132.

Here, a deceleration ratio of at least one of the first in-wheel motors 122 may be formed differently from a deceleration ratio of at least one of the second in-wheel motors 132. For example, the deceleration ratio of at least one of the first in-wheel motors 122 may be larger than the deceleration ratio of at least one of the second in-wheel motors 132.

The motor controller 140 may control electric current applied to at least one of the first in-wheel motors 122 and the second in-wheel motors 132. Here, the first motor controller 141 may control electric current applied to the first in-wheel motors 122, and the second motor controller 142 may control electric current applied to the second in-wheel motors 132. The first motor controller 140 and the second motor controller 142 may control electric current respectively applied to the first in-wheel motors 122 and the second in-wheel motors 132 so that the direction of the vehicle may be changed to the left.

When controlled as described above, the direction of a vehicle may be changed to the left while the second in-wheel motors 132 and the first in-wheel motors 122 are operated. Hence, when the handle unit 170 is not operated, the user may manually control the direction of the vehicle through the emergency steering signal input unit 180.

While controlled as described above, the user may remove the force applied to the emergency steering signal input unit 180. Here, the emergency steering signal input unit 180 is formed in a switch form, and if the force is removed, the emergency steering signal may not be transmitted to the motor controller 140.

If controlled as described above, the first in-wheel motors 122 and the second in-wheel motors 132 may stop and the vehicle may also stop.

2. When a Main Controller Breaks Down

A case where the main controller 160 has broken down may be controlled similarly to a case where the handle unit 170 has broken down. When the main controller 160 breaks down, the direction of a vehicle may not be controlled even if a user operates the handle unit 170.

Here, the user may operate the emergency steering signal input unit 180 to steer the vehicle. The method of controlling the direction of the vehicle through the emergency steering signal input unit 180 is similar to the method described above, and thus, detailed description is omitted here.

Hence, the emergency steering system 100 may manually control the direction of a vehicle even when the main controller 160 breaks down, and thus, the user's safety may be secured.

3. When a Steering Controller Breaks Down

When the steering controller 150 breaks down, the main controller 160 may determine whether the steering controller 150 has broken down.

(1) An Operation where a Main Controller Determines Whether a Steering Controller has Broken Down The steering controller 150 may be electrically connected to the main controller 160 for mutual communication. Here, when the steering controller 150 breaks down, a breakdown signal may be inputted or may not be inputted to the main controller 160. In the above case, the main controller 160 may determine that the steering controller 150 has broken down.

(2) An Operation of Controlling an in-Wheel Motor

In the above case, the main controller 160 may control the first and second in-wheel motors 122 and 132 using various methods. For example, in the above case, the main controller 160 may be electrically connected to the motor controller 140 to control the in-wheel motors. Furthermore, in the above case, the main controller 160 may inform whether the steering controller 150 has broken down through the alarm unit 190, and may manually control the in-wheel motors.

Here, the case where at least one of the in-wheel motors is manually controlled is similar to the above described case where the handle unit 170 breaks down, and thus, the detailed description is omitted here. Hence, the description will focus on the case where the main controller 160 automatically controls the motor controller 140.

When the main controller 160 controls the motor controller 140, the main controller 160 may recognize a steering operation signal of the handle unit 170, and transmit the steering operation signal to the motor controller 140. When the main controller 160 controls the motor controller 140, the motor controller 140 may be controlled based on an emergency steering signal applied to the emergency steering signal input unit 180 prior to the above steering operation signal. Here, the controlling method by recognizing the steering operation signal is similar to the controlling method based on the emergency steering signal, and thus, the description below will focus on the case of controlling based on the steering operation signal for the convenience of description.

If the steering operation signal is applied, the main controller 160 may control the motor controller 140. If the steering operation signal is a signal that changes the direction to the left, the main controller 160 may control at least one of the first motor controller 141 and the second motor controller 142. In contrast, if the steering operation signal is a signal that changes the direction to the right, the main controller 160 may also control at least one of the second motor controller 142 and the first motor controller 141.

Here, if the vehicle is to be controlled to the left direction, the first motor controller 141 may control to reduce electric current applied to at least one of the first in-wheel motors 122. The second motor controller 142 may also control to reduce electric current applied to at least one of the second in-wheel motors 132.

In the above case, a reduction ratio of electric current applied to at least one of the first in-wheel motors 122 may be different from a reduction ratio of the electric current applied to at least one of the second in-wheel motors 132. The reduction ratio applied to at least one of the first in-wheel motors 122 may be formed greater than the reduction ratio of the electric current applied to at least one of the second in-wheel motors 132. Hence, the reduction ratio of the speed of at least one of the first in-wheel motors 122 may be greater than the reduction ratio of the speed of at least one of the second in-wheel motors 132.

When the first in-wheel motors 122 and the second in-wheel motors 132 are controlled, the direction of a vehicle may be changed to the left.

When the vehicle is to be controlled to the right, the control may be different. The reduction ratio of the electric current applied to at least one of the second in-wheel motors 132 may be formed smaller than the reduction ratio of the electric current applied to at least one of the first in-wheel motors 122.

According to the above embodiments, when devices related with steering of a vehicle break down, the direction of the vehicle may be manually or automatically controlled. Furthermore, a user may simply control the direction of a vehicle in an emergency, and thus, user convenience and safety may be secured.

Although the above exemplary embodiments are described for a case in which each wheel unit includes a corresponding in-wheel motor and a steering unit, the inventive concept is not limited thereto. That is, the inventive concept may apply to a case in which a single in-wheel motor and a single steering unit may control two or more wheel units.

While the inventive concept has been particularly shown and described with reference to exemplary embodiments thereof, it will be understood by those of ordinary skill in the art that various changes in form and details may be made therein without departing from the spirit and scope of the inventive concept as defined by the following claims.

What is claimed is:

1. An emergency steering system comprising:
a handle unit configured to receive a first steering operation signal from a driver to change a direction of a vehicle;
a plurality of wheel units each including an in-wheel motor and a steering unit;
a motor controller configured to control an electric current applied to at least one of the in-wheel motors; and
an emergency steering signal input unit configured to receive an emergency steering signal from the driver as a second steering operation signal, which is a signal for applying the electric current to the at least one of the in-wheel motors, configured to transmit the received emergency steering signal to the motor controller, and configured to control the motor controller based on the emergency steering signal to change the direction of the vehicle,
wherein the motor controller is configured to control the electric current applied to the at least one of the in-wheel motors based on the emergency steering signal.

2. The emergency steering system of claim 1, wherein an amount of the electric current applied to the at least one of the in-wheel motors is changed based on the emergency steering signal.

3. The emergency steering system of claim 1, wherein the emergency steering signal input unit includes a direction display unit that is configured to display the direction of the vehicle to which the driver manually applies force to the emergency steering signal input unit to change the direction of the vehicle.

4. The emergency steering system of claim 1, wherein the main controller is configured to control the direction of the vehicle by controlling the electric current applied to the at least one in-wheel motor according to the first steering operation signal without turning the plurality of wheel units with respect to the direction of the vehicle.

5. An emergency steering system comprising:
- a handle unit configured to receive a steering operation signal from a driver to change a direction of a vehicle;
- a plurality of wheel units including at least one in-wheel motor and at least one steering unit;
- a motor controller configured to control an electric current applied to the at least one in-wheel motor;
- a steering unit controller electrically connected to the steering unit and configured to control the steering unit according to the steering operation signal; and
- a main controller that is electrically connected to the steering unit controller to control the steering unit controller and configured to determine a breakdown of the steering unit controller,
- wherein in response to the determining the breakdown of the steering unit controller, the main controller is configured to control the direction of the vehicle by controlling the electric current applied to the at leas one in-wheel motor according to the steering operation signal without turning the plurality of wheel units with respect to the direction of the vehicle.

6. The emergency steering system of claim 5, further comprising:
- an alarm unit configured to externally provide information,
- wherein the main controller is configured to control the alarm unit to reveal breakdown information if it is determined that the steering unit controller is broken down.

7. The emergency steering system of claim 5, further comprising:
- wherein the main controller is electrically connected to the motor controller, and is configured to control operation of the in-wheel-motor by applying an emergency steering signal to the motor controller if it is determined that the steering unit controller is broken down.

8. The emergency steering system of claim 7, wherein the main controller is configured to control the motor controller to change an intensity of an electric current applied to at least one of the in-wheel motors based on the emergency steering signal.

9. The emergency steering wheel of claim 5, further comprising:
- an emergency steering signal input unit configured to externally receive an emergency steering signal from the driver as a second steering operation signal and transmit the received emergency steering signal to the motor controller,
- wherein the motor controller is configured to control the in-wheel motor based on the emergency steering signal to change the direction of the vehicle.

10. The emergency steering system of claim 9, wherein an amount of the electric current applied to the in-wheel motor is changed based on the emergency steering signal.

11. The emergency steering system of claim 5, wherein the emergency steering signal input unit comprises a direction display unit that is configured to display a direction.

12. A method of controlling an emergency steering system, the method comprising:
- providing an emergency steering signal input unit discrete from a handle unit, the handle unit configured to receive a first steering operation signal from a driver to control a direction of a vehicle;
- determining, via a main controller, whether a steering controller is broken down;
- receiving an emergency steering signal from the driver as a second steering operation signal, the emergency steering signal generated by the emergency steering signal input unit to control the direction of the vehicle; and
- controlling, via a motor controller, at least one in-wheel motor based on the emergency steering signal to control the direction of the vehicle.

13. The method of claim 12, further comprising controlling the motor controller to change an amount of an electric current applied to the in-wheel motor based on the emergency steering signal.

14. The method of claim 12, further comprising controlling the main controller to externally display a breakdown of the steering controller if it is determined that the steering controller is broken down.

15. The method of claim 12, wherein the controlling the at least one in-wheel motor comprises controlling the direction of the vehicle by controlling an electric current applied to the at least one in-wheel motor according to the first steering operation signal without turning the plurality of wheel units with respect to the direction of the vehicle.

16. A method of controlling an emergency steering system, the method comprising:
- receiving a first steering operation signal from a driver via a handle unit to control a direction of a vehicle;
- determining, via a main controller, whether a steering controller configured to control direction of the vehicle has broken down; and
- controlling, via the main controller, the direction of the vehicle by controlling an amount of electric current applied to at least one in-wheel motor through a motor controller according to the steering operation signal without turning a plurality of wheel units with respect to the direction of the vehicle if it is determined that the steering controller has broken down.

17. The method of claim 16, further comprising controlling an amount of current applied to the in-wheel motor to change based on the emergency steering signal.

* * * * *